US012088495B2

(12) United States Patent
Mariyani et al.

(10) Patent No.: US 12,088,495 B2
(45) Date of Patent: Sep. 10, 2024

(54) INTELLIGENT ROUTE SELECTION FOR LOW LATENCY SERVICES

(71) Applicant: T-Mobile USA, Inc., Bellevue, WA (US)

(72) Inventors: Anil Kumar Mariyani, Ashburn, VA (US); Deepesh Belwal, Ashburn, VA (US); Rajil Malhotra, Olathe, KS (US); Chris Jensen, Snoqualmie, WA (US); Sriharsha Kadalbal, Sammamish, WA (US); Anuj Sharma, Broadlands, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 87 days.

(21) Appl. No.: 17/371,029

(22) Filed: Jul. 8, 2021

(65) Prior Publication Data

US 2023/0012242 A1 Jan. 12, 2023

(51) Int. Cl.
*H04L 45/24* (2022.01)
*H04L 43/087* (2022.01)
(Continued)

(52) U.S. Cl.
CPC ............ *H04L 45/24* (2013.01); *H04L 43/087* (2013.01); *H04L 45/121* (2013.01);
(Continued)

(58) Field of Classification Search
CPC ..... H04L 45/24; H04L 45/078; H04L 45/122; H04L 45/123
(Continued)

(56) References Cited

U.S. PATENT DOCUMENTS 10,158,566 B2 * 12/2018 Lakshmikanthan .. H04L 12/465
10,608,923 B2 *  3/2020 Wen ........................ H04L 45/02
(Continued)

FOREIGN PATENT DOCUMENTS

CN       110572323 B  *  3/2022  ............. H04L 45/02
CN       114363249 A  *  4/2022  ......... H04L 41/0806

OTHER PUBLICATIONS

International Search Report and Written Opinion, by the ISA/KR, mailed Oct. 26, 2022, regarding PCT Application No. PCT/US2022/036029 (9 pages).

(Continued)

*Primary Examiner* — Melvin H Pollack
(74) *Attorney, Agent, or Firm* — Foley IP Law, PLLC (57) ABSTRACT

A solution for route selection includes receiving, by a network repository, from a first network function (NF), a query related to a target NF; querying, by the network repository, a route selection node for a shortest path to the target NF; receiving, by the network repository, from the route selection node, an indication of the shortest path to the target NF; and based on at least receiving the indication of the shortest path to the target NF, transmitting, by the network repository, to the first NF, a route to the target NF. In some examples, the shortest path has at least one of: a minimum number of hops, a minimum latency, a minimum jitter, and a minimum weighted transport score. In some examples, the route selection node is co-located with the network repository, which may be a network repository function (NRF).

20 Claims, 5 Drawing Sheets

(51) Int. Cl.
| | |
|---|---|
| *H04L 45/00* | (2022.01) |
| *H04L 45/12* | (2022.01) |
| *H04L 45/121* | (2022.01) |
| *H04L 45/122* | (2022.01) |
| *H04L 45/125* | (2022.01) |
| *H04L 45/302* | (2022.01) |
| *H04L 45/42* | (2022.01) |
| *H04L 45/44* | (2022.01) |
| *H04L 45/74* | (2022.01) |
| *H04L 45/745* | (2022.01) |

(52) U.S. Cl.
CPC ......... *H04L 45/122* (2013.01); *H04L 45/123* (2013.01); *H04L 45/124* (2013.01); *H04L 45/125* (2013.01); *H04L 45/126* (2013.01); *H04L 45/127* (2013.01); *H04L 45/20* (2013.01); *H04L 45/22* (2013.01); *H04L 45/26* (2013.01); *H04L 45/302* (2013.01); *H04L 45/304* (2013.01); *H04L 45/42* (2013.01); *H04L 45/44* (2013.01); *H04L 45/74* (2013.01); *H04L 45/745* (2013.01); *H04L 45/12* (2013.01)

(58) Field of Classification Search
USPC .................................................. 709/238–244
See application file for complete search history.

(56) References Cited

U.S. PATENT DOCUMENTS

| | | | | |
|---|---|---|---|---|
| 10,673,742 | B2* | 6/2020 | Allan | H04L 45/16 |
| 10,827,002 | B2* | 11/2020 | Zhao | H04L 9/40 |
| 10,848,576 | B2* | 11/2020 | Stammers | H04L 67/51 |
| 10,873,524 | B2* | 12/2020 | Allan | H04L 45/122 |
| 10,965,582 | B2* | 3/2021 | Yadlapalli | H04L 45/033 |
| 10,999,776 | B2* | 5/2021 | Jagannatha | H04L 41/0894 |
| 11,051,192 | B2* | 6/2021 | Li | H04W 24/08 |
| 11,310,151 | B2* | 4/2022 | Taft | H04W 48/16 |
| 11,582,675 | B2* | 2/2023 | Zhibo | H04W 40/12 |
| 11,606,244 | B2* | 3/2023 | Calmic | H04L 45/22 |
| 11,706,053 | B2* | 7/2023 | Luft | H04L 12/5691 |
| | | | | 709/224 |
| 11,706,662 | B2* | 7/2023 | Nguyen | H04L 1/1825 |
| | | | | 370/328 |
| 11,777,846 | B2* | 10/2023 | Van de Velde | H04L 45/306 |
| | | | | 370/392 |
| 11,792,236 | B2* | 10/2023 | Agarwal | H04L 65/1069 |
| | | | | 370/352 |
| 11,888,957 | B2* | 1/2024 | Krishan | H04L 67/61 |
| 2006/0291446 | A1* | 12/2006 | Caldwell | H04L 45/42 |
| | | | | 370/395.5 |
| 2012/0039339 | A1* | 2/2012 | Kurita | H04L 45/04 |
| | | | | 370/400 |
| 2014/0098673 | A1* | 4/2014 | Lee | H04L 41/122 |
| | | | | 370/255 |
| 2017/0303259 | A1 | 10/2017 | Lee et al. | |
| 2018/0109439 | A1* | 4/2018 | Chen | H04L 45/124 |
| 2019/0215724 | A1 | 7/2019 | Fard et al. | |
| 2021/0144517 | A1* | 5/2021 | Guim Bernat | H04L 41/0869 |
| 2021/0314842 | A1* | 10/2021 | Padlikar | H04W 24/02 |
| 2021/0320854 | A1* | 10/2021 | King, V | H04L 43/0817 |
| 2021/0377155 | A1* | 12/2021 | Chen | H04L 45/16 |
| 2021/0377162 | A1* | 12/2021 | Filsfils | H04L 45/42 |
| 2022/0007251 | A1* | 1/2022 | Allan | H04W 36/22 |
| 2022/0231938 | A1* | 7/2022 | Jain | H04L 45/02 |
| 2022/0263567 | A1* | 8/2022 | Sullivan | H04B 7/1851 |
| 2022/0312295 | A1* | 9/2022 | Hashemi | H04L 45/64 |
| 2022/0345929 | A1* | 10/2022 | Lee | H04L 43/0852 |
| 2023/0198890 | A1* | 6/2023 | Lin | H04L 45/125 |
| | | | | 709/238 |
| 2023/0318960 | A1* | 10/2023 | Krishan | H04L 45/34 |
| | | | | 370/389 |
| 2023/0362127 | A1* | 11/2023 | Korja | H04L 61/4511 |
| 2023/0388230 | A1* | 11/2023 | Krishan | H04L 45/26 |
| 2024/0022950 | A1* | 1/2024 | Bouton | H04W 28/20 |
| 2024/0022996 | A1* | 1/2024 | Lu | H04W 40/02 |
| 2024/0031256 | A1* | 1/2024 | Han | H04L 61/5076 |
| 2024/0040427 | A1* | 2/2024 | Vamanan | H04L 41/0894 |
| 2024/0049148 | A1* | 2/2024 | Yuan | H04W 52/42 |

OTHER PUBLICATIONS

Gamal Sallam et al.; Shortest Path and Maximum Flow Problems Under Service Function Chaining Constraints; arXiv: 1801.05795v1 [cs.NI], Jan. 17, 2018; abstract and pp. 1-9.

Nan Wang et al.; Shortest-path-based back-pressure routing with single-FIFO queueing in ad hoc networks; IET Netw., 2019, vol. 8 Iss. 5, pp. 339-345, Aug. 27, 2019.

Akshay Gadre et al.; Centralized approaches for virtual network function placement in SDN-enabled networks; EURASIP Journal on Wireless Communications and Networking, 2018: 197, 2018; pp. 1-19.

* cited by examiner

INTELLIGENT ROUTE SELECTION FOR LOW LATENCY SERVICES

BACKGROUND

Cellular networks typically route traffic between some network functions (NFs) based on static configurations. For example, a first NF may perform a query to a network resource function (NRF) to identify an instance identification (ID) or an internet protocol (IP) address for a target (second) NF, and deliver a message via a service communication proxy (SCP) using a pre-configured (static) route. In some scenarios, the pre-configured routes are manually input by network operators. Thus, northbound messages, routed between the application plane and the control plane, and southbound messages, routed between the control plane and the data plane, may experience unnecessary latency when, due to dynamic network conditions, the pre-configured (static) routes are not the shortest routes. Beyond general network efficiency and performance considerations, this may result in acute negative consequences for ultra-reliable low-latency communication (URLLC) services.

URLLC may include smart factory and industrial automation applications; healthcare industry applications such as augmented reality (AR) assisted surgery; transportation and logistics applications such as intelligent transportation, drone-based delivery to estimate traffic density in real-time, self-driven cars, predictive vehicle maintenance, and traffic management; entertainment and media such as live event reporting, cloud-based entertainment (e.g., augmented reality (AR), virtual reality (VR) and mixed reality (MR)), and online gaming; smart electricity grid; and harbor automation. URLLC network slicing may be highly sensitive to network latency variations.

SUMMARY

The following summary is provided to illustrate examples disclosed herein, but is not meant to limit all examples to any particular configuration or sequence of operations.

A solution for route selection includes receiving, by a network repository, from a first network function (NF), a query related to a target NF; querying, by the network repository, a route selection node for a shortest path to the target NF; receiving, by the network repository, from the route selection node, an indication of the shortest path to the target NF; and based on at least receiving the indication of the shortest path to the target NF, transmitting, by the network repository, to the first NF, a route to the target NF. In some examples, the shortest path has at least one of: a minimum number of hops, a minimum latency, a minimum jitter, and a minimum weighted transport score. In some examples, the first and/or target NF is an access and mobility function (AMF), an authentication server function (AUSF), a unified data management (UDM) node, and a user data repository (UDR). In some examples, the route selection node is co-located with the network repository, which may be a network repository function (NRF).

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

A solution for route selection includes receiving, by a network repository, from a first network function (NF), a query related to a target NF; querying, by the network repository, a route selection node for a shortest path to the target NF; receiving, by the network repository, from the route selection node, an indication of the shortest path to the target NF; and based on at least receiving the indication of the shortest path to the target NF, transmitting, by the network repository, to the first NF, a route to the target NF. In some examples, the shortest path has at least one of: a minimum number of hops, a minimum latency, a minimum jitter, and a minimum weighted transport score. In some examples, the first and/or target NF is an access and mobility function (AMF), an authentication server function (AUSF), a unified data management (UDM) node, and a user data repository (UDR). In some examples, the route selection node is co-located with the network repository, which may be a network repository function (NRF).

Another solution for route selection includes receiving, by a network repository, from a first network function (NF), a query related to a target NF; querying, by the network repository, a route selection node for a shortest path to the target NF; based on at least receiving the indication of the shortest path, transmitting, by the network repository or the route selection node, to the first NF, an indication of a shortest path to the target NF.

Aspects of the disclosure improve the speed of networks, such as cellular networks, by, based on at least receiving the indication of the shortest path to the target NF, transmitting, by the network repository, to the first NF, a route to the target NF. This enables transmitting a message from the first NF to the target NF along a route with lower latency than a pre-configured (static) route may provide. This dynamic determination of the shortest path, and intelligent selection of the shortest path as the message route, may be especially beneficial for ultra-reliable low-latency communication (URLLC) service messages. Network slicing, which creates multiple unique logical and virtualized networks over a common multi-domain infrastructure, is used in URLLC, and is sensitive to latencies. Additionally, this simplifies initial network configuration for operators, as manual generation of the static path lists is now optional.

There may be multiple shortest paths, due to the flexible definition of "shortest" and the uncertainty in latency predictions. For example, the shortest path may be alternatively defined as having the minimum number of hopes (e.g., the fewest number of intervening nodes), the minimum latency (even if the number of hops is larger), a minimum jitter, or a minimum weighted transport score. In examples using a weighted transport score, weighted factors may include path isolation and/or a response time of an intervening node. Path isolation may be important for security, for example encrypted links and other data that may be an attractive eavesdropping target. Response time of an intervening node is a factor in end-to-end latency. Further, latency predictions may be calculated based on latency measurements.

Latency may vary over time, so latency predictions will have a degree of unpredictability and will eventually expire. Thus, a latency prediction for one path, which is based on a more recent measurement, may provide a superior route choice over a more stale latency prediction for a different path that is based on an older measurement—even if the latency prediction based on the older measurement is slightly lower. Even if latency measurements are of approximately the same age, due to the uncertainties, two different paths having similar predicted latencies may swap in actual experienced latency order when the different paths are actually used (e.g., the path having slightly higher expected latency may have slightly lower latency when actually used). In some examples, the alternative shortest paths are different paths to the same target NF, although in some examples, the alternative shortest paths are paths to different target NFs.

In support of this dynamic route selection, a network route selection function (NRSF) is introduced, although it should be understood that the functionality described herein for the NSRF may be instead distributed among multiple existing NFs. Additionally, when the NSRF returns multiple shortest paths (as opposed to returning only a single shortest path result), various NFs may have route selection logic (RSL) to select from among the alternative shortest paths. Network slicing, which creates multiple unique logical and virtualized networks over a common multi-domain infrastructure, is used in URLLC, and is sensitive to latencies.

Figure 1:
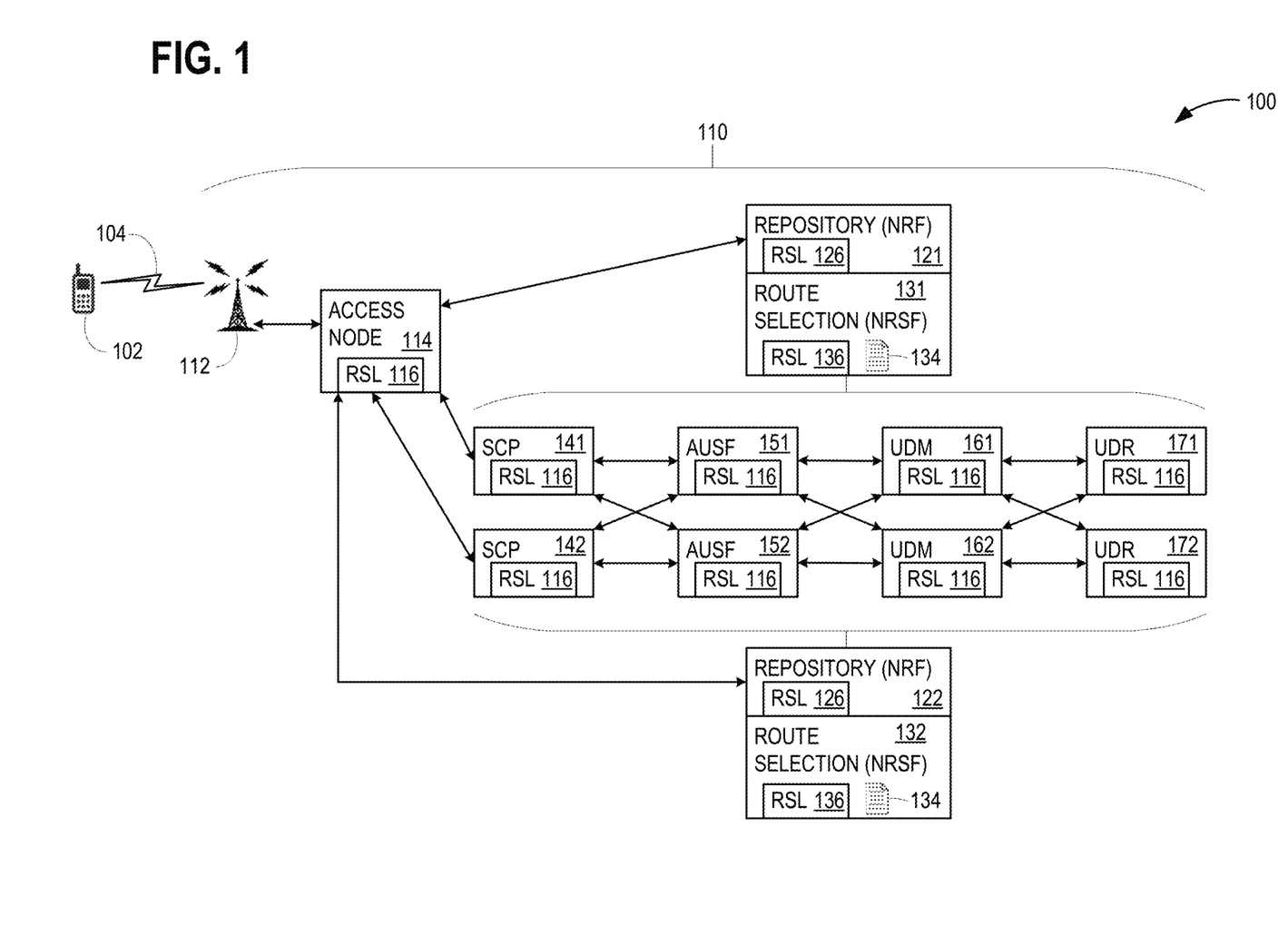
FIG. 1 illustrates an exemplary arrangement that advantageously employs intelligent route selection for low latency services.

With reference now to the figures, FIG. 1 illustrates an arrangement 100 that advantageously employs intelligent route selection for low latency services. In arrangement 100, UE 102 seeks to employ a URLLC service that uses data available on a UDR 171 or a UDR 172. A UDR is a converged repository which may service other NFs, for example by storing data. In some examples, UDRs are managed by UDMs. A typical network may have approximately a dozen UDMs and approximately a half dozen UDRs (although a different number of each may be used). The UDMs and UDRs may be geographically dispersed, in order to permit rapid retrieval by users located in various regions.

UE 102 communicates with network 110 (e.g., a cellular network) via an air interface 104 to a radio access network (RAN) 112. An access node 114, for example an access and mobility network (AMF) for fifth generation (5G) cellular networks or a mobility management entity (MME) for fourth generation (4G) cellular networks, provides entry into the core of network 110. Network 110 may include additional nodes, which are not shown in order to preserve clarity for FIG. 1. These additional nodes may include a session management function (SMF), a policy control function (PCF), a user plane function (UPF), a proxy-call session control function (P-CSCF), and others for 5G, and/or equivalent nodes for 4G or other cellular technology generations.

As illustrated, access node 114 has an RSL 116 providing route selection logic functionality in order to request a shortest path and also to select a route when multiple alternative shortest paths are returned in response to a shortest path inquiry. Some examples of network 110 may have a few dozen geographically-dispersed implementations of access node 114. Network 110 is illustrated has having an SCP 141, an SCP 142, an AUSF 151, an AUSF 152, a UDM 161, a UDM 162, UDR 171, and UDR 172. These are shown as interconnected, although the representation in FIG. 1 is notional. In implemented versions of network 110, the numbers of the nodes and internode connectivity of the nodes may vary considerably.

An SCP assists network operators with secure and managing their networks by providing routing control, resiliency, and observability to the core network. This simplifies the core's routing topology, enabling scalability. An AUSF performs authentication with UEs to determine whether UEs are permitted to access network resources. UDM provide centralized control for network user data, storing data locally and/or in a UDR. As illustrated, each of SCP 141, SCP 142, AUSF 151, AUSF 152, UDM 161, UDM 162, UDR 171, and UDR 172 has its own version of RSL 116 in order to perform route selection as needed, for example to request (query for) a shortest path and to select a route when multiple alternative shortest paths are returned in response to the shortest path inquiry.

Network 110 also has multiple network repositories (e.g., NRFs), and access node 114 is illustrated as having connectivity to two, a network repository 121 and a network repository 122 (although a different number may be used). In general, an NRF supports service discovery, for example receiving NF discovery requests and providing information about relevant discovered NF instances, in response. In some examples, network repository 121 and network repository 122 each maintain profiles of available NF instances and their supported services in network 110. This enables consumer NF instances to discover other NF instances and track their status (e.g., available, unavailable, and address). For example, each of network repository 121 and network repository 122 may maintain profiles of each of SCP 141, SCP 142, AUSF 151, AUSF 152, UDM 161, UDM 162, UDR 171, and UDR 172.

When network repository 121 receives an inquiry for a target NF that indicates a shortest path is being requested, network repository 121 queries a route selection node 131 (e.g., an NRSF). Route selection node 131 determines one or more shortest paths by calculating expected latencies and/or using a weighted transport score, as described above. This determination is performed by an RSL 136 that selects a shortest path algorithm, possibly according to criteria accompanying the request. For example, some NFs may emphasize latency over path isolation and/or number of hops, whereas other NFs may emphasize other factors (e.g., isolation over number of hops). RSL 136 uses node data 134 that has latency measurement values, response times of various nodes, and connectivity information. In some examples, network repository 121 collects and provides the data for node data 134. In some examples, node data 134 resides on network repository 121.

In some examples, route selection node 131 is co-located with network repository 121, in order to reduce latency. In some examples, route selection node 131 is integrated within the functionality of network repository 121. In some examples, route selection node 131 is spread across multiple nodes within network 110. In some examples, route selection node 131 is a stand-alone node.

Network repository 121 has an RSL 126 for configurations in which route selection node 131 returns multiple alternative shortest paths, and network repository 121 reduces the number of shortest paths that is returned to the querying NF (e.g., route selection node 131 returns three alternative paths to network repository 121 and network repository 121 reduces the number that is forwarded to the querying node to one or two paths). Network repository 122 is configured similarly to network repository 121 and may default to querying route selection node 132 (which is configured similarly to route selection node 131), due to the proximity of route selection node 132 to network repository 122 (e.g., co-location or otherwise nearby).

Figure 2:
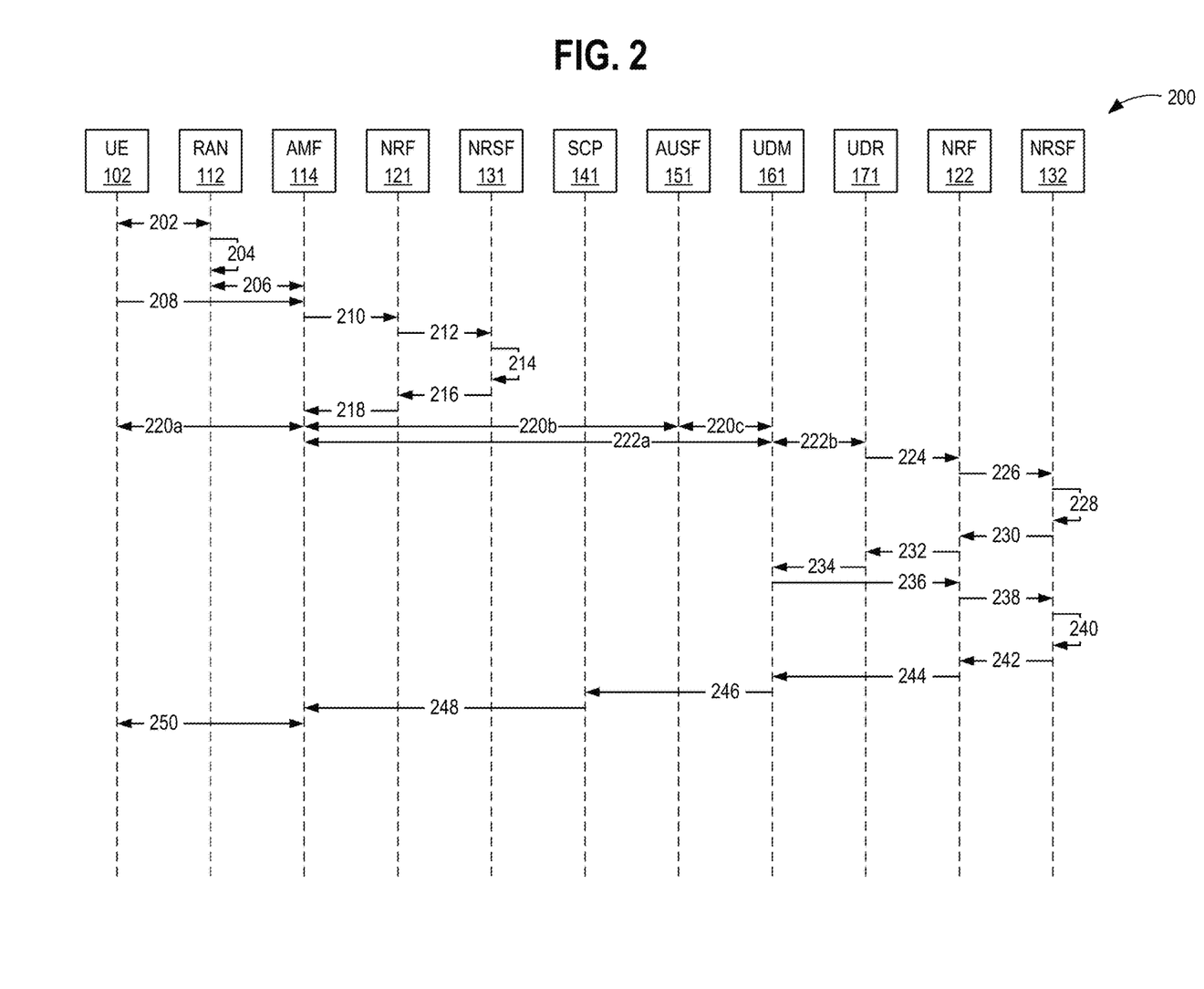
FIG. 2 illustrates an example message sequence diagram for route selection in the arrangement of FIG. 1.
Figure 3:
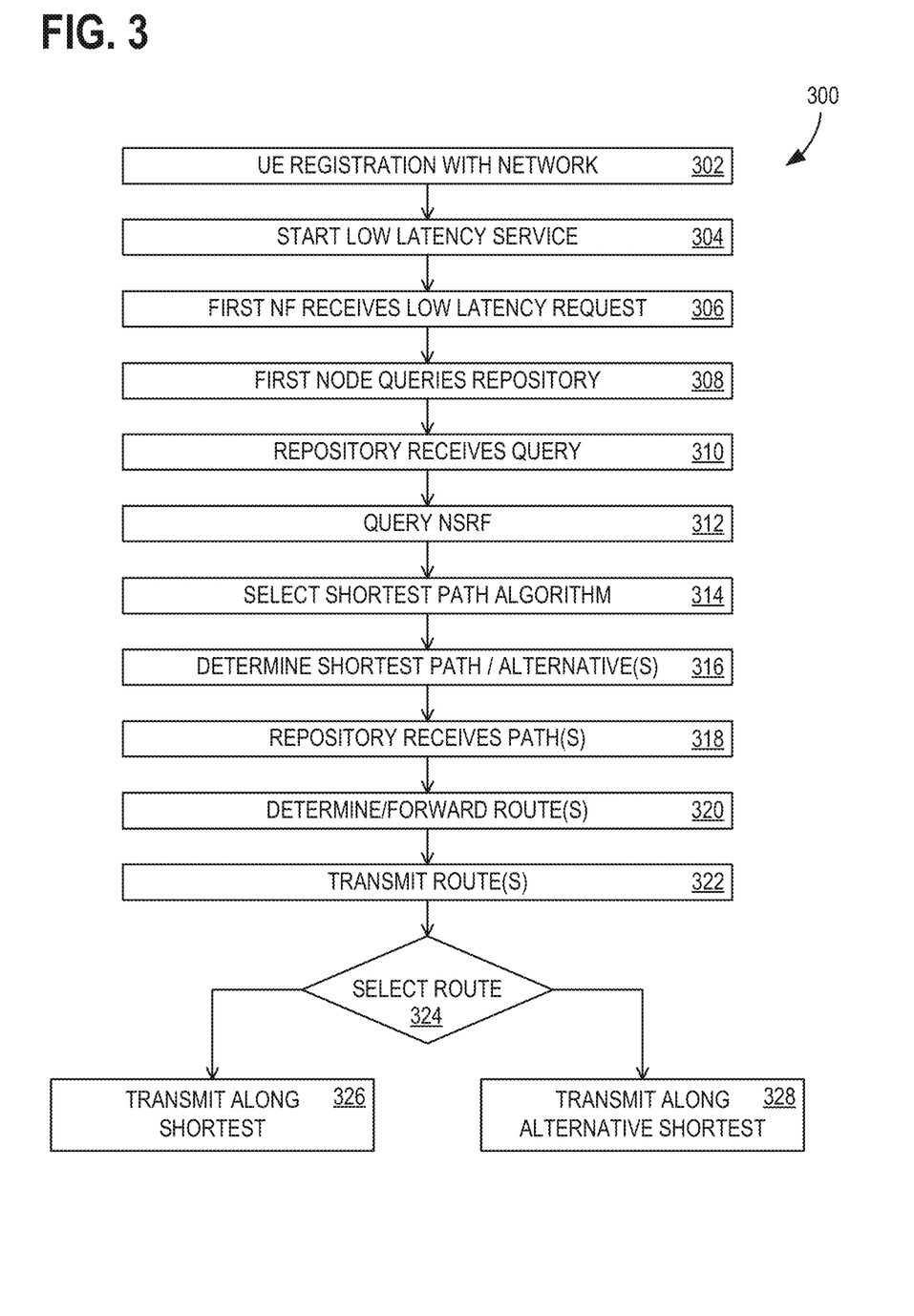
FIG. 3 illustrates a flowchart of exemplary operations for performing route selection in the arrangement of FIG. 1.

FIG. 1 will be described in further detail in view of FIGS. 2 and 3. FIG. 2 illustrates an example message sequence diagram 200 for route selection in arrangement 100, and FIG. 3 illustrates a flowchart 300 of exemplary operations for performing route selection in arrangement 100. In some examples, at least a portion of message sequence diagram 200 and/or flowchart 300 may be performed using one or more computing devices 500 of FIG. 5. FIGS. 1-3 should be viewed together.

Flowchart 300 commences with operation 302, which includes UE 102 registering with network 110, for example with RAN 112 and access node 114. This occurs using messages 202-206. Messages 202 register UE 102 with RAN 112. RAN 112 selects access node 114 in a decision represented as 204, and access node 114 accepts management of UE 102 with messages 206. Typically, a UE will register with an access node that is nearby.

UE 102 requests connectivity with a URLLC service in operation 304 to access real-time data over a low latency connection, using a message 208. In some examples, UE 102 transmits message 208 for a specific target NF, such as UDR 171. In some examples, UE 102 identifies only an NF type (e.g., a UDR) and a network repository identifies the specific target NF (e.g., UDR 171). Access node 114 (here, the "first NF") receives message 208 from UE 102, in operation 306. Access node 114 then seeks to identify the shortest path to the requested NF, which is UDM 161 or a UDM that will be identified by network repository 121. This will be accomplished using operations 308-322 and messages 210-217.

In operation 308, access node 114 sends a query related to the target NF to network repository 121 to ascertain the shortest path to the target NF as message 210. In some examples, the query related to the target NF identifies a specific target NF. In some examples, the query related to the target NF identifies a target NF type. In some examples, the shortest path to the target NF comprises a shortest path between the first NF (here, access node 114) and the target NF. It should be understood that operation 308 may be accomplished using any of the nodes in network 110 that are configured to request a shortest path as the "first NF") and any of the other nodes in network 110 as the target NF. That is, the first NF may be any of an AMF, an AUSF, a SCP, a UDM node, and a UDR. The target NF may also be any of those nodes. The shortest path may be any path having a feature such as a minimum number of hops, a minimum latency, a minimum jitter, and a minimum weighted transport score. In some examples, the weighted transport score includes a factor for path isolation and/or a response time of an intervening node.

Operation 310 includes receiving, by network repository 121, from the first NF (here, access node 114) the query (message 210) related to the target NF. Operation 312 includes querying, by network repository 121, route selection node 131 for the shortest path to the target NF using message 212. In some examples, network repository 121 comprises an NRF and/or route selection node 131 comprises an NRSF. In some examples, route selection node 131 is co-located with network repository 121. Operation 314 includes route selection node 131 selecting at least one shortest path algorithm for RSL 136 to determine one or more shortest paths, using node data 134.

Operation 316 includes route selection node 131 determining at least one shortest path according to the at least one selected shortest path algorithm. In some examples, operation 316 further includes determining at least one alternative shortest path according to a shortest path algorithm. Route selection node 131 may use a single shortest path algorithm and select the top N, or may use multiple shortest path algorithms and select the top results from the multiple algorithms. In some examples, a first shortest path identifies a first specific target NF and an alternative shortest path identifies a second specific target NF different NF than the first specific target NF, but of the same target NF type. Operations 314 and 316 in FIG. 3 are represented as 214 in FIG. 2.

Operation 318 includes route selection node 131 sending an indication of the shortest path to the target NF (or multiple shortest paths to the target NF) to network repository 121 as message 216. Operation 318 also includes receiving, by network repository 121, from route selection node 131, the indication of the shortest path to the target NF (e.g., receiving message 216). In some examples, operation 318 further includes receiving, by network repository 121, from route selection node 131, an indication of the alternative shortest path to the target NF. In some examples, network repository 121 reduces the number of alternative shortest paths down to a single recommendation for returning the access node 114. In such examples, operation 320 includes based on at least the indication of the shortest path to the target NF, determining the route to the target NF. (See decision operation 324, described below) In some examples, network repository 121 merely forwards just a single shortest path or all of the shortest paths, whichever are returned by route selection node 131.

Operation 322 includes, based on at least receiving the indication of the shortest path to the target NF, transmitting, by network repository 121, to access node 114 (here, the first NF), the route to the target NF. This is shown as message 218. In some examples, the route to the target NF comprises a route between the first NF and the target NF. In some examples, transmitting, by network repository 121, to the first NF, the route to the target NF comprises transmitting, by network repository 121, to the first NF, the indication of the shortest path to the target NF. In some examples, transmitting, by network repository 121, to the first NF, the route to the target NF (also or instead) comprises transmitting, by network repository 121, to the first NF, the indication of the alternative shortest path to the target NF.

Decision operation 324 selects a specific route from among multiple alternative shortest path results. Decision operation 324 may occur as part of operation 316 within route selection node 131 using RSL 136, or within network repository 121 using RSL 126 as part of operation 320. As illustrated in flowchart 300, however, decision operation 324 is performed by the first node using RSL 116. In some examples, decision operation 324 uses a round-robin scheme, which is common for load balancing.

Operation 326 includes transmitting a message from access node 114 (the first NF) to the target NF along the route indicated by network repository 121 (e.g., the shortest path to the target NF). Alternatively, operation 328 includes transmitting a message from the first NF to the target NF along the alternative shortest path to the target NF. In some examples, the transmitted message comprises a URLLC service message. Examples of the message transmitted in operation 326 or 328 include authentication messages 220b and registration messages 222a.

With access node 114 now having a route to UDM 161 that satisfies the selected shortest path criteria, UE 102 authenticates itself to AUSF 151 and thus to UDM 161. This is shown as messages 220a between UE 102 and access node 114, messages 220b between access node 114 and AUSF 151, and messages 220c between AUSF 151 and UDM 161. access node 114 completes registration with UDR 171 using messages 222a between access node 114 and UDM 161 and messages 222b between UDM 161 and UDR 171.

Messages 224-250 in message sequence diagram 200 represent two additional iterations of flowchart 300, but with network repository 122 and route selection node 132. One iteration uses messages 224-234, with UDR 171 as the first NF and UDM 161 as the target NF. Another iteration uses messages 236-246, with UDM 161 as the first NF and SCP 141 as the target NF. Network repository 122 is used instead of network repository 121, due to the proximity of network repository 122 to UDR 171 and UDM 161 in the scenario depicted by message sequence diagram 200.

In some examples of network 110, a UDR delivers notifications to a UDM or another NF that is subscribed for notifications in scenarios such as provisioning transaction changes or other specified change events. For provisioning transactions that result in UDR-initiated messages, UDR 171 messages network repository 122 to determine the location of the end NF and the shortest path for message delivery. This is shown as message 224. Network repository 122 queries route selection node 132 with message 226, which selects the shortest path(s) in 228. The shortest path(s) is returned to network repository 122 with message 230, and forwarded to UDR 171 as message 232. Using this path as the delivery route, UDR 171 delivers message 234 to UDM 161.

For UDM 161 to deliver a message to access node 114 (e.g., forwarding message 234), SCP 141 is used as a transfer point. UDM 161 messages network repository 122 to determine the shortest path to SCP 141. This is shown as message 236. Network repository 122 queries route selection node 132 with message 238, which selects the shortest path(s) in 240. The shortest path(s) is returned to network repository 122 with message 242, and forwarded to UDM 161 as message 244. Using this path as the delivery route, UDM 161 delivers message 246 to SCP 141. SCP 141 forwards the message to access node 114 as message 248, which then forwards the message to UE 102 (via RAN 112) as message 250. In some examples, SCP 141 also performs a shortest path look-up for access node 114 in accordance with flowchart 300, although in some examples, the path between SCP 141 and access node 114 is pre-determined.

Figure 4A:
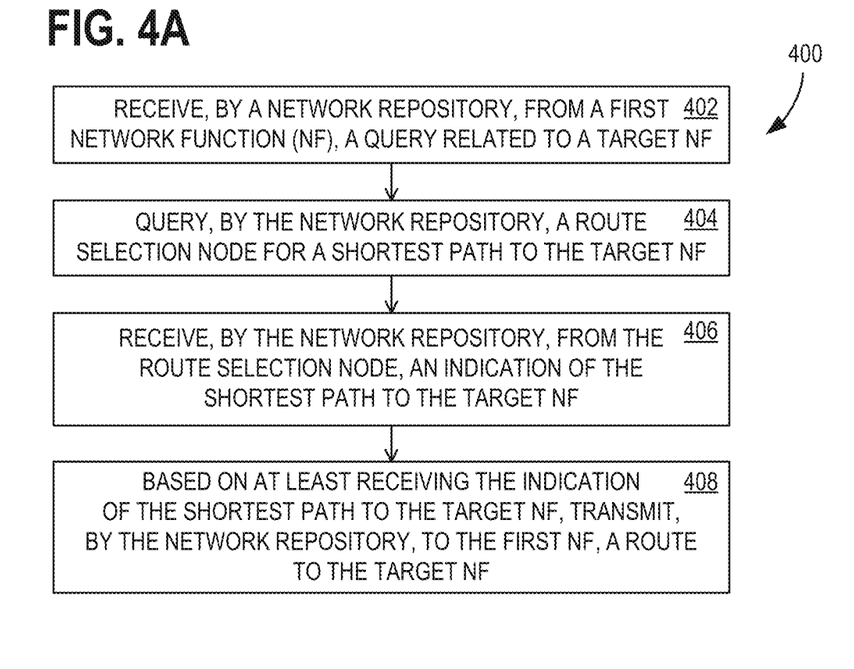
FIGS. 4A and 4B illustrate additional flowcharts of exemplary operations for performing route selection in the arrangement of FIG. 1.

FIG. 4A illustrates a flowchart 400 of exemplary operations associated with examples of arrangement 100. In some examples, at least a portion of flowchart 400 may be performed using one or more computing devices 500 of FIG. 5. Flowchart 400 commences with operation 402, which includes receiving, by a network repository, from a first network function (NF), a query related to a target NF. Operation 404 includes querying, by the network repository, a route selection node for a shortest path to the target NF. Operation 406 includes receiving, by the network repository, from the route selection node, an indication of the shortest path to the target NF. Operation 408 includes, based on at least receiving the indication of the shortest path to the target NF, transmitting, by the network repository, to the first NF, a route to the target NF.

Figure 4B:
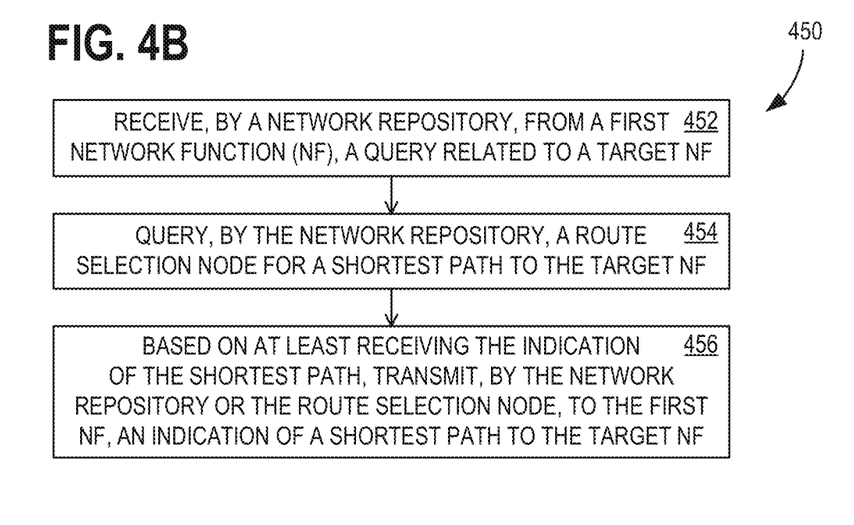

FIG. 4B illustrates a flowchart 450 of exemplary operations associated with examples of arrangement 100. In some examples, at least a portion of flowchart 450 may be performed using one or more computing devices 500 of FIG. 5. Flowchart 450 commences with operation 452, which includes receiving, by a network repository, from a first NF, a query related to a target NF. Operation 454 includes querying, by the network repository, a route selection node for a shortest path to the target NF. Operation 456 includes, based on at least receiving the indication of the shortest path, transmitting, by the network repository or the route selection node, to the first NF, an indication of a shortest path to the target NF.

Figure 5:
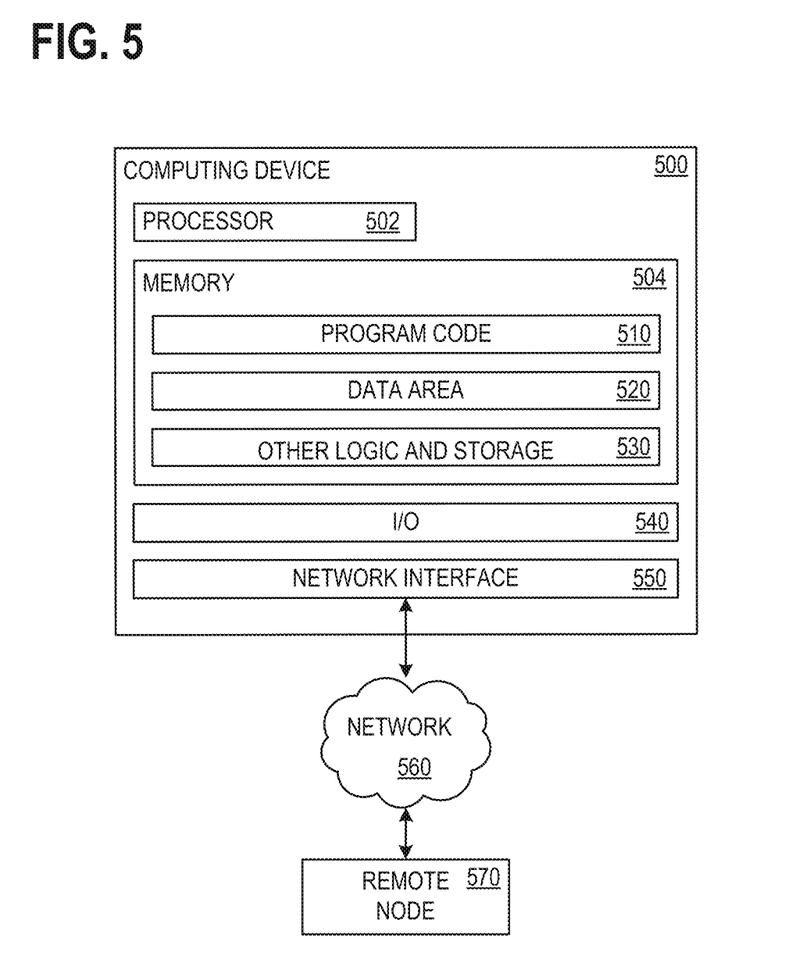
FIG. 5 illustrates a block diagram of a computing device suitable for implementing various aspects of the disclosure.

FIG. 5 illustrates a block diagram of computing device 500 that may be used as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500. For example, a remote node 570 may represent another of the above-noted nodes within arrangement 100.

Additional Examples

An example method of route selection comprises: receiving, by a network repository, from a first NF, a query related to a target NF; querying, by the network repository, a route selection node for a shortest path to the target NF; receiving, by the network repository, from the route selection node, an indication of the shortest path to the target NF; and, based on at least receiving the indication of the shortest path to the target NF, transmitting, by the network repository, to the first NF, a route to the target NF.

An example method of route selection comprises: receiving, by a network repository, from a first NF, a query related to a target NF; querying, by the network repository, a route selection node for a shortest path to the target NF; and, based on at least receiving the indication of the shortest path, transmitting, by the network repository or the route selection node, to the first NF, an indication of a shortest path to the target NF.

An example system for route selection comprises: a processor; and a computer-readable medium storing instructions that are operative upon execution by the processor to: receive, by a network repository, from a first NF, a query related to a target NF; query, by the network repository, a route selection node for a shortest path to the target NF; receive, by the network repository, from the route selection node, an indication of the shortest path to the target NF; and, based on at least receiving the indication of the shortest path to the target NF, transmit, by the network repository, to the first NF, a route to the target NF.

An example system for route selection comprises: a processor; and a computer-readable medium storing instructions that are operative upon execution by the processor to: receive, by a network repository, from a first NF, a query related to a target NF; query, by the network repository, a route selection node for a shortest path to the target NF; and, based on at least receiving the indication of the shortest path, transmit, by the network repository or the route selection node, to the first NF, an indication of a shortest path to the target NF.

One or more example computer storage devices has computer-executable instructions stored thereon, which, upon execution by a computer, cause the computer to perform operations comprising: receiving, by a network repository, from a first NF, a query related to a target NF; querying, by the network repository, a route selection node for a shortest path to the target NF; receiving, by the network repository, from the route selection node, an indication of the shortest path to the target NF; and, based on at least receiving the indication of the shortest path to the target NF, transmitting, by the network repository, to the first NF, a route to the target NF.

One or more example computer storage devices has computer-executable instructions stored thereon, which, upon execution by a computer, cause the computer to perform operations comprising: receiving, by a network repository, from a first NF, a query related to a target NF; querying, by the network repository, a route selection node for a shortest path to the target NF; and, based on at least receiving the indication of the shortest path, transmitting, by the network repository or the route selection node, to the first NF, an indication of a shortest path to the target NF.

Alternatively, or in addition to the other examples described herein, examples include any combination of the following:
transmitting a message from the first NF to the target NF along the route indicated by the network repository;
the transmitted message comprises an ultra-reliable low-latency communication (URLLC) service message;
the shortest path comprises a path having at least one of: a minimum number of hops, a minimum latency, a minimum jitter, and a minimum weighted transport score;
the weighted transport score includes a factor for path isolation;
the weighted transport score includes a factor for a response time of an intervening node;
the first NF is selected from the list consisting of: an AMF, an AUSF, a UDM node, and a UDR;
the target NF is selected from the list consisting of: an AMF, an AUSF, a UDM node, and a UDR;
the route selection node is co-located with the network repository;
the route selection node comprises an NRSF;
the network repository comprises an NRF;
the route to the target NF comprises a route between the first NF and the target NF;
the shortest path to the target NF comprises a shortest path between the first NF and the target NF;
based on at least the indication of the shortest path to the target NF, determining the route to the target NF;
transmitting, by the network repository, to the first NF, the route to the target NF comprises transmitting, by the network repository, to the first NF, the indication of the shortest path to the target NF;
receiving, by the network repository, from the route selection node, an indication of an alternative shortest path to the target NF;
selecting at least one shortest path algorithm;
determining at least one shortest path according to the at least one selected shortest path algorithm;
determining at least one alternative shortest path according to a shortest path algorithm;
the query from the first NF related to the target NF identifies a target NF type;
the query from the first NF related to the target NF identifies a specific target NF;
the route to the target NF identifies a first specific target NF of the target NF type;
the alternative shortest path identifies a second specific target NF of the target NF type, the second specific target NF being a different NF than the first specific target NF; and
transmitting a message from the first NF to the target NF along the shortest path to the target NF.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of route selection, the method comprising:
receiving, by a network repository, from a first network function (NF), a query identifying a target NF type, wherein the network repository comprises a network repository function (NRF);
identifying, by the network repository, a first target NF and a second target NF associated with the target NF type;
querying, by the network repository, a route selection node for a shortest path to the first target NF and a shortest path to the second target NF;
receiving, by the network repository, from the route selection node, indications of a first shortest path to the first target NF and an alternative shortest path to the second target NF;

selecting, from among the first shortest path and the alternative shortest path, a selected shortest path;
based on at least selecting the selected shortest path, transmitting, by the network repository, to the first NF, a route to a target NF identified in the selected shortest path; and
transmitting a message from the first NF to the target NF along the route indicated by the network repository, wherein the transmitted message comprises an ultra-reliable low-latency communication (URLLC) service message.

2. The method of claim 1, wherein the selected shortest path comprises a path having a minimum latency, and wherein the path having the minimum latency is selected based on a more recent measurement.

3. The method of claim 1, wherein the shortest path criteria are selected from a list consisting of:
a number of hops, a latency, a jitter, a weighted transport score, path isolation.

4. The method of claim 3, wherein the weighted transport score includes a factor for a response time of an intervening node.

5. The method of claim 1, wherein the target NF type is selected from a list consisting of:
an access and mobility function (AMF), an authentication server function (AUSF), a unified data management (UDM) node, and a user data repository (UDR).

6. The method of claim 1, further comprising:
receiving, by the network repository, from the route selection node, indications of multiple alternative shortest paths; and
selecting, by the network repository, from the multiple alternative shortest paths, the alternative shortest path.

7. The method of claim 1, wherein the route selection node comprises a network route selection function (NRSF).

8. A system for route selection, the system comprising:
a processor; and
a computer-readable medium storing instructions that are operative upon execution by the processor to:
receive, by a network repository, from a first network function (NF), a query identifying a target NF type, wherein the network repository comprises a network repository function (NRF);
identify, by the network repository, a first target NF and a second target NF associated with the target NF type;
query, by the network repository, a route selection node for a shortest path to the first target NF and a shortest path to the second target NF;
receive, by the network repository, from the route selection node, indications of a first shortest path to the first target NF and an alternative shortest path to the second target NF;
select, from among the first shortest path and the alternative shortest path, a selected shortest path;
based on at least selecting the selected shortest path, transmitting, by the network repository, to the first NF, a route to a target NF identified in the selected shortest path; and
transmit a message from the first NF to the target NF along the route indicated by the network repository, wherein the transmitted message comprises an ultra-reliable low-latency communication (URLLC) service message.

9. The system of claim 8, wherein the selected shortest path comprises a path having a minimum latency, and wherein the path having the minimum latency is selected based on a more recent measurement.

10. The system of claim 8, wherein the shortest path criteria are selected from a list consisting of:
a number of hops, a latency, a jitter, a weighted transport score, path isolation.

11. The system of claim 10, wherein the weighted transport score includes a factor for a response time of an intervening node.

12. The system of claim 8, wherein the target NF type is selected from a list consisting of:
an access and mobility function (AMF), an authentication server function (AUSF), a unified data management (UDM) node, and a user data repository (UDR).

13. The system of claim 8, wherein the instructions are further operative to:
receive, by the network repository, from the route selection node, indications of multiple alternative shortest paths; and
select, by the network repository, from the multiple alternative shortest paths, the alternative shortest path.

14. The system of claim 8, wherein the route selection node comprises a network route selection function (NRSF).

15. One or more computer storage devices having computer-executable instructions stored thereon, which, upon execution by a computer, cause the computer to perform operations comprising:
receiving, by a network repository, from a first network function (NF), a query identifying a target NF type;
identifying, by the network repository, a first target NF and a second target NF associated with the target NF type;
querying, by the network repository, a route selection node for a shortest path to the first target NF and a shortest path to the second target NE;
receiving, by the network repository, from the route selection node, indications of a first shortest path to the first target NF and an alternative shortest path to the second target NF;
selecting, from among the first shortest path and the alternative shortest path, a selected shortest path;
based on at least selecting the selected shortest path, transmitting, by the network repository, to the first NF, a route to a target NF identified in the selected shortest path; and
transmitting a message from the first NF to the target NF along the route indicated by the network repository, wherein the transmitted message comprises an ultra-reliable low-latency communication (URLLC) service message.

16. The one or more computer storage devices of claim 15, wherein the selected shortest path comprises a path having a minimum latency, and wherein the path having the minimum latency is selected based on a more recent measurement.

17. The one or more computer storage devices of claim 15, wherein the shortest path criteria are selected from a list consisting of:
a number of hops, a latency, a jitter, a weighted transport score, path isolation.

18. The one or more computer storage devices of claim 17, wherein the weighted transport score includes a factor for a response time of an intervening node.

19. The one or more computer storage devices of claim 15, wherein the target NF type is selected from a list consisting of:

an access and mobility function (AMF), an authentication server function (AUSF), a unified data management (UDM) node, and a user data repository (UDR).

20. The one or more computer storage devices of claim 15, wherein the operations further comprise:
  receiving, by the network repository, from the route selection node, indications of multiple alternative shortest paths; and
  selecting, by the network repository, from the multiple alternative shortest paths, the alternative shortest path.

* * * * *